United States Patent [19]

Cianciotto

[11] Patent Number: 5,562,456
[45] Date of Patent: Oct. 8, 1996

[54] APPARATUS FOR TEACHING HOW TO TIE NECKTIES

[75] Inventor: Daniel Cianciotto, Hauppauge, N.Y.

[73] Assignee: Tie Teacher, Inc., Hauppauge, N.Y.

[21] Appl. No.: 420,855

[22] Filed: Apr. 12, 1995

[51] Int. Cl.$^6$ .................................................. G09B 19/24
[52] U.S. Cl. .......................................... 434/260; 289/17
[58] Field of Search .................................. 434/260, 258, 434/400, 433; 223/111, DIG. 4, DIG. 1, DIG. 3, 85; 289/13, 15, 1.5, 17

[56] References Cited

U.S. PATENT DOCUMENTS

| | | | |
|---|---|---|---|
| D. 202,316 | 9/1965 | Pehr | 223/DIG. 1 |
| 1,367,461 | 2/1921 | Caumont . | |
| 1,458,066 | 6/1923 | Compte | 223/111 |
| 2,628,360 | 2/1953 | Kush | 2/153 |
| 2,713,170 | 7/1955 | Block | 2/153 |
| 2,733,447 | 2/1956 | Kuriyama | 2/153 |
| 2,958,870 | 11/1960 | Johnson | 2/153 |
| 3,752,374 | 8/1973 | Pro | 223/111 |
| 4,474,316 | 10/1984 | Philibert | 223/DIG. 1 |
| 4,572,555 | 2/1986 | Henderson, Jr. | 289/17 |
| 4,815,772 | 3/1989 | Lizarraga | 289/1.5 |
| 5,088,118 | 2/1992 | Whiteley | 2/144 |
| 5,218,722 | 6/1993 | Vandenberg | 2/145 |

FOREIGN PATENT DOCUMENTS

231105  3/1925  United Kingdom ...................... 289/17

*Primary Examiner*—Gene Mancene
*Assistant Examiner*—Jeffrey A. Smith
*Attorney, Agent, or Firm*—Darby & Darby, P.C.

[57] ABSTRACT

A necktie knot tying facilitator comprising an elongated member that is shaped so that a first open loop extending outwardly in a first direction and partially surrounding a first space is connected at its top end to a first end of a second open loop. The second open loop extends upward in a second direction, partially surrounding a second space. The second end of the second open loop is connected to a top end of a third open loop that extend outwardly in a third direction and partially surrounds a third space, the third open loop being symmetrical opposed to the first open loop. The bottom end of the third open loop is connected to the bottom arm of the first open loop, thus forming a horizontal base segment. A rectangularly shaped handle is attached to the horizontal base segment. The first, second, and third spaces combine to form an enclosed space at the center of the tie-tying facilitator. Each vertical leg of the second open loop has a clip attached to it in order to hold the tie body as the knot is formed. The horizontal base segment is also fitted with a horizontal clip to hold the tie tail in place as the knot is being formed.

12 Claims, 7 Drawing Sheets

APPARATUS FOR TEACHING HOW TO TIE NECKTIES

FIELD OF THE INVENTION

This invention relates to an apparatus for tying a necktie, and more specifically, to an apparatus to use in conjunction with a set of instructions to teach an individual how to tie a variety of knots in a necktie.

BACKGROUND OF THE INVENTION

The quest for the perfect necktie knot has endured for generations, a quest reflected in the numerous inventions directed towards assisting individuals to achieve, on a consistent basis, a symmetrical, triangular necktie knot. For example, U.S. Pat. No. 5,218,722 to Vandenberg, issued Jun. 15, 1993 discloses a tie fastener through which the necktie is threaded, to form a properly tied necktie. In the '722 patent, the tie fastener remains as part of the completed knot with the tie wrapped around the tie fastener. The tie fastener's triangular shape imparts shape to the knot.

Similarly, in U.S. Pat. No. 2,958,870 to Johnson issued Nov. 8, 1960, and U.S. Pat. No. 2,628,360 to Kush issued Feb. 17, 1953, a triangular shaped pin or clasp is provided to ensure that the knot formed around the triangular clasp is of a consistent "V" shape. In the Johnson '870 patent, a triangular shaped pin or clasp is provided that is slipped on the tie prior to knotting. The tie is then knotted such that underlying portions of the knot are engaged by members extending from the pin. As with the '722 patent to Vandenberg, the triangular shaped pin becomes part of the completed knot, helping to shape the knot. The '870 patent is disclosed for use in forming a four-in-hand knot only.

The '360 patent to Kush discloses a "necktie knot form" adapted to be incorporated within a four-in-hand knot. The necktie knot form is intended to aid in tying, forming and holding the "perfectly" formed knot. Like the Johnson and Vandenberg references, the Kush necktie knot form is placed onto the tie before the knot is formed, and remains part of the completed knot.

The prior art is primarily directed towards assisting a user who is already familiar with how to form the desired necktie knot. This assistance is rendered by providing a device designed to remain an integral part of the completed necktie, thus imparting the desired shape to the necktie knot.

Also, the prior art devices are dedicated typically to assist a user in tying one type of knot. For example, the above cited references are used for tying four-in-hand knots, and cannot readily be used to form other desired knots.

It would, therefore, be desirable to provide a device that could be used as a teaching aid for individuals unfamiliar with the art of tying neckties. It would further be desirable to be able to use this teaching device to tie a variety of different knots.

OBJECTS OF THE INVENTION

An object of the invention is to provide a device which could be used in conjunction with a set of instructions, to assist an individual in learning how to tie a desired necktie knot.

A further object of the invention is to provide a device that would assist an individual to achieve consistent results when tying the necktie, even after the art of tying the necktie has been mastered.

SUMMARY OF THE INVENTION

The necktie knot tying facilitator ("tie-tying facilitator") of the present invention comprises an elongated member having a first end and a second end. The elongated member is shaped to form three open loops and an L-shaped tail surrounding a central space as follows: (1) a first open loop extending outwardly in a first direction, the first open loop having upper and lower horizontal arms, and partially surrounding a first space; (2) a second open loop extending upwards in a second direction, the second open loop having first and second vertical legs, and partially surrounding a second space; and (3) a third open loop extending in a third direction, the third open loop having upper and lower horizontal arms, and partially surrounding a third space. The elongated member also has an L-shaped tail segment extending in a downward direction having a vertical segment and a horizontal segment.

As constructed, the upper horizontal arm of the first open loop is attached to the first vertical leg of the second open loop, the second vertical leg of the second open loop is attached to the upper horizontal arm of the third open loop, and the lower horizontal arm of the third open loop is attached to the top of the vertical portion of the L-shaped tail segment. As a result, the first open loop is symmetrically opposed to the third open loop, and the first, second, and third spaces are contiguous with each other in the center of the tie-tying facilitator.

In a preferred embodiment, the lower horizontal arm of the third open loop is connected to the lower horizontal arm of the first open loop, forming a horizontal base segment. The horizontal base segment serves to completely enclose the central space. A rectangular shaped handle is attached to the horizontal base segment.

In use, a tie having a large end or tie head and a small end or tie tail is removably attached to the tie-tying facilitator by (1) a horizontal clip attached to either the horizontal segment of the L-shaped tail or the horizontal base segment and (2) two clips or slotted cylindrical pegs, one attached to each vertical leg of the second loop.

BRIEF DESCRIPTION OF ILLUSTRATIVE EMBODIMENTS

The foregoing and other features of the present invention will be more readily apparent from the following detailed description and drawings of illustrative embodiments of the invention in which:

FIGS. 5–11 illustrate a preferred embodiment in which a central space is completely enclosed by the elongated member, wherein

DETAILED DESCRIPTIONS OF ILLUSTRATIVE EMBODIMENTS

Figures 1, 2:
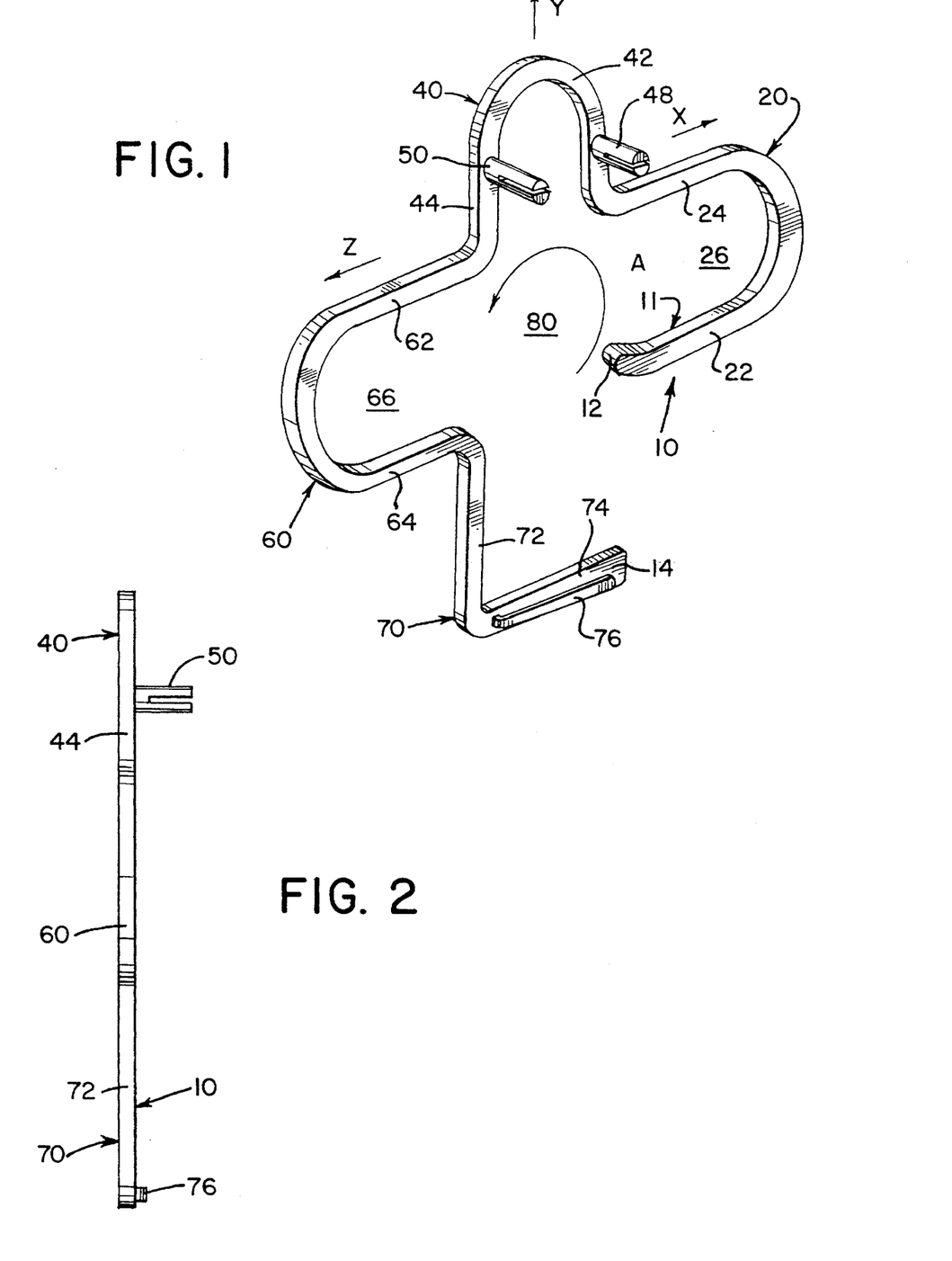
FIG. 1 is a front perspective view of an illustrative embodiment of the invention.
FIG. 2 is a left side elevation view (the right side elevation view is identical)

FIG. 1 illustrates a first embodiment of the tie-tying facilitator 10. As shown in FIG. 1, the tie-tying facilitator 10 comprises an elongated member 11 having a first end 12 and a second end 14. The elongated member 11 is shaped to form three interconnected open loops 20, 40, and 60, such that the three open loops partially surrounding a central space 80.

Proceeding from the first end 12 in a counterclockwise direction along the arrow A, the elongated member 11 is shaped to form a first open loop 20 extending outwardly in a first direction X. The first open loop 20 has a lower horizontal arm 22 and an upper horizontal arm 24, and partially surrounds a first space 26.

The upper horizontal arm 24 of the first open loop 20 is connected to the first vertical leg 42 of the second open loop 40 extending upwardly in a second direction Y. The second open loop 40 partially surrounds a second space 46. The second vertical leg 44 is connected to the upper horizontal arm 62 of the third open loop 60. The third open loop 60 extends outward in a third direction Z and partially surrounds a third space 66. The third open loop 60 is preferably positioned such that the third open loop 60 is symmetrically opposed to the first open loop 20.

The lower horizontal arm 64 of the third open loop 60 is connected to the vertical segment 72 of a downward directed L-shaped tail segment 70. The elongated member 11 culminates with the horizontal segment 74 of the L-shaped tail segment 70.

The first space 26, the second space 46 and the third space 66 are contiguous with each other, and together comprise the partially enclosed central space 80.

In a preferred embodiment (FIGS. 5–11), the lower horizontal arm 64b of the third open loop 60b is connected to the lower horizontal arm 22b of the first open loop 20b, thus forming a horizontal base segment 82. The horizontal base segment 82 serves to completely enclose the central space 80. A rectangular shaped handle 84 is preferably attached to the horizontal base segment 82.

The tie-tying facilitator 10 may be provided with means to suitably secure the tie body to the tie-tying facilitator 10 as the knot is being formed. Preferably, the tie body is secured by clips or pegs attached to each vertical arm 42 and 44 of the second open loop 40, and by a horizontal clip 76. The horizontal clip 76 secures the tie tail 92 and may be placed in a variety of locations, to include the horizontal segment 74 or the L-shaped tail 70 (FIG. 1), or the horizontal base segment 82 (FIG. 5).

The tie tail 92 may be secured to the tie-tying facilitator 10 by a horizontal clip 76 that lies substantially parallel to the horizontal segment 74 of the L-shaped tail 70. The horizontal clip 76 is attached to the horizontal segment 74 at one end, and is spaced sufficiently apart from the horizontal segment 74 to snugly receive the tie tail 92. The tie tail 92 is inserted in between the horizontal clip 76 and the horizontal segment 74 of the L-shaped tail 70 as the knot is being formed.

Figures 4, 5:
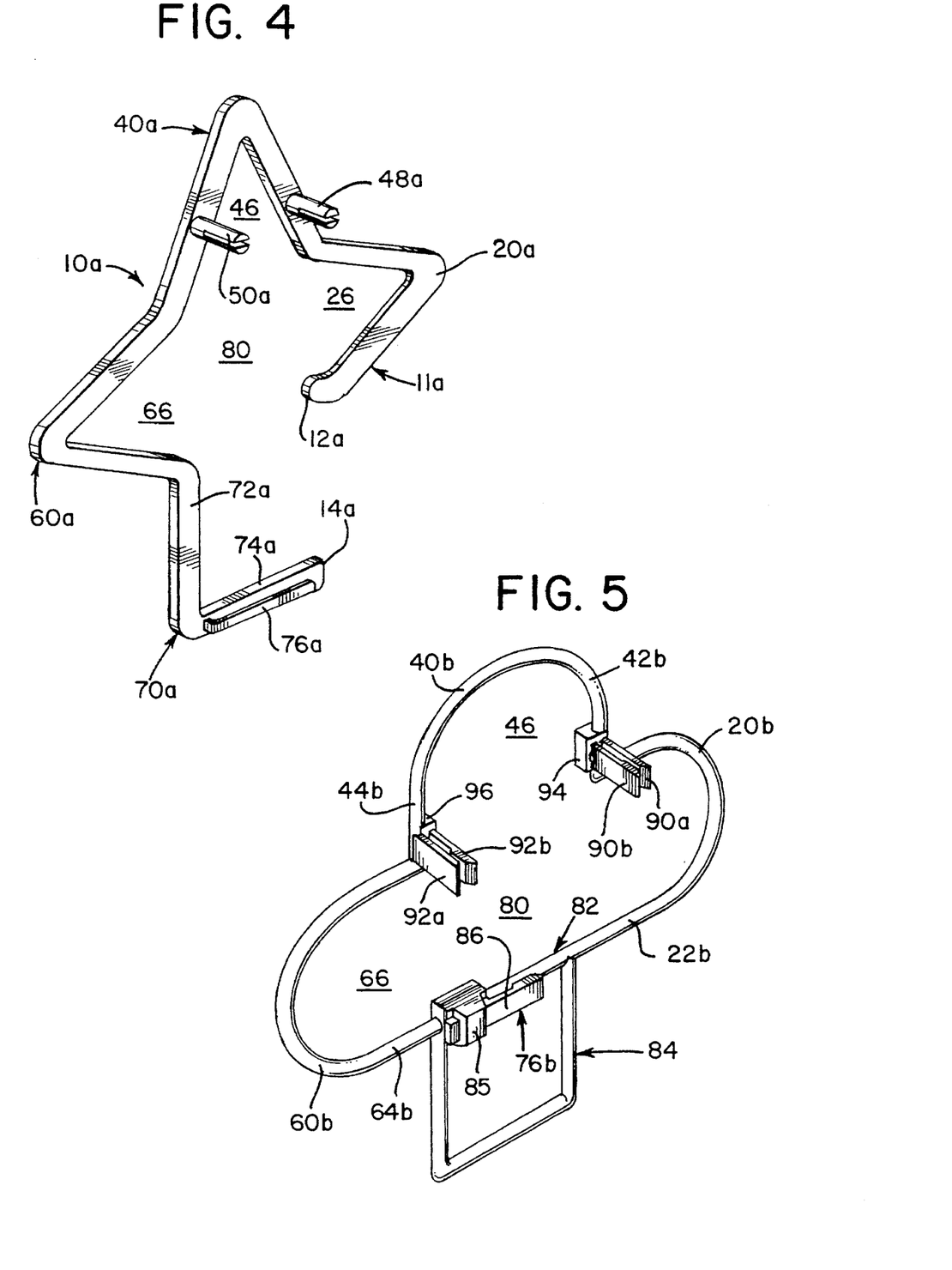
FIG. 4 illustrates an alternate embodiment having three V-shaped open loops and an L-shaped tail.
FIG. 5 is a perspective view of the preferred embodiment.
Figure 6:
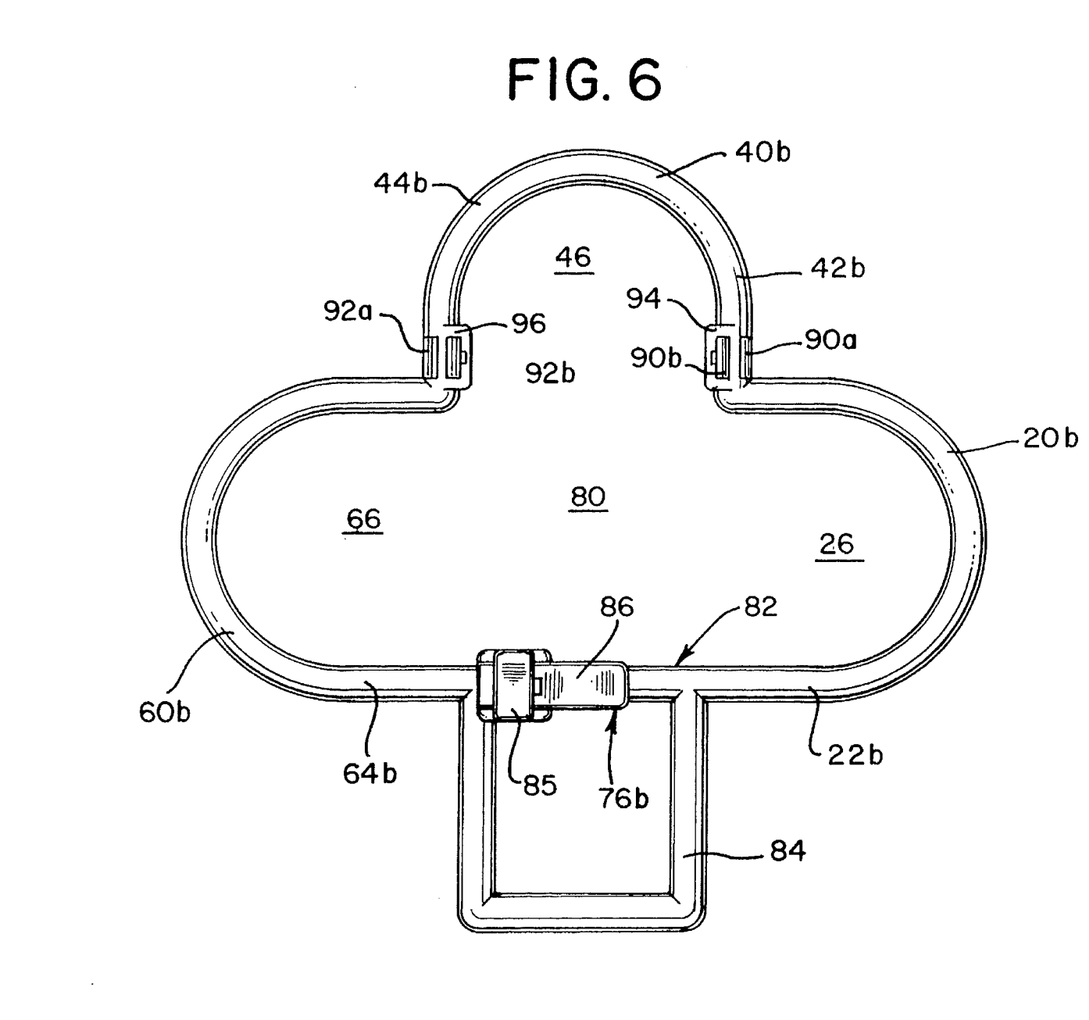
FIG. 6 is a front elevation view.
Figure 7:
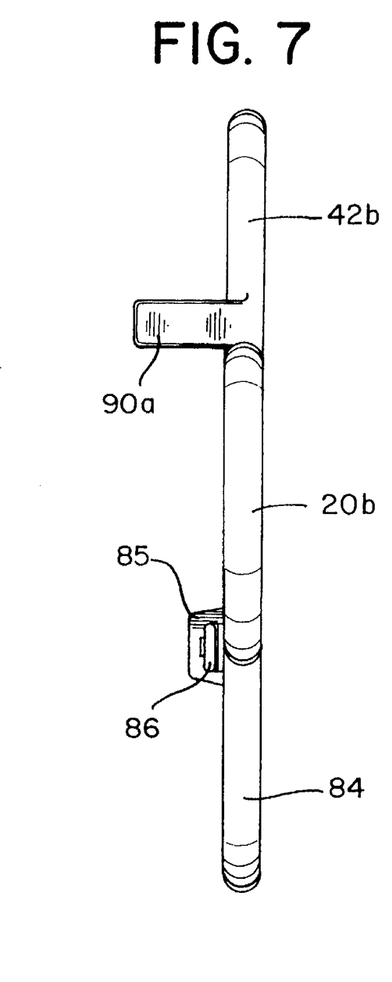
FIG. 7 is a left-side elevation view.
Figure 8:
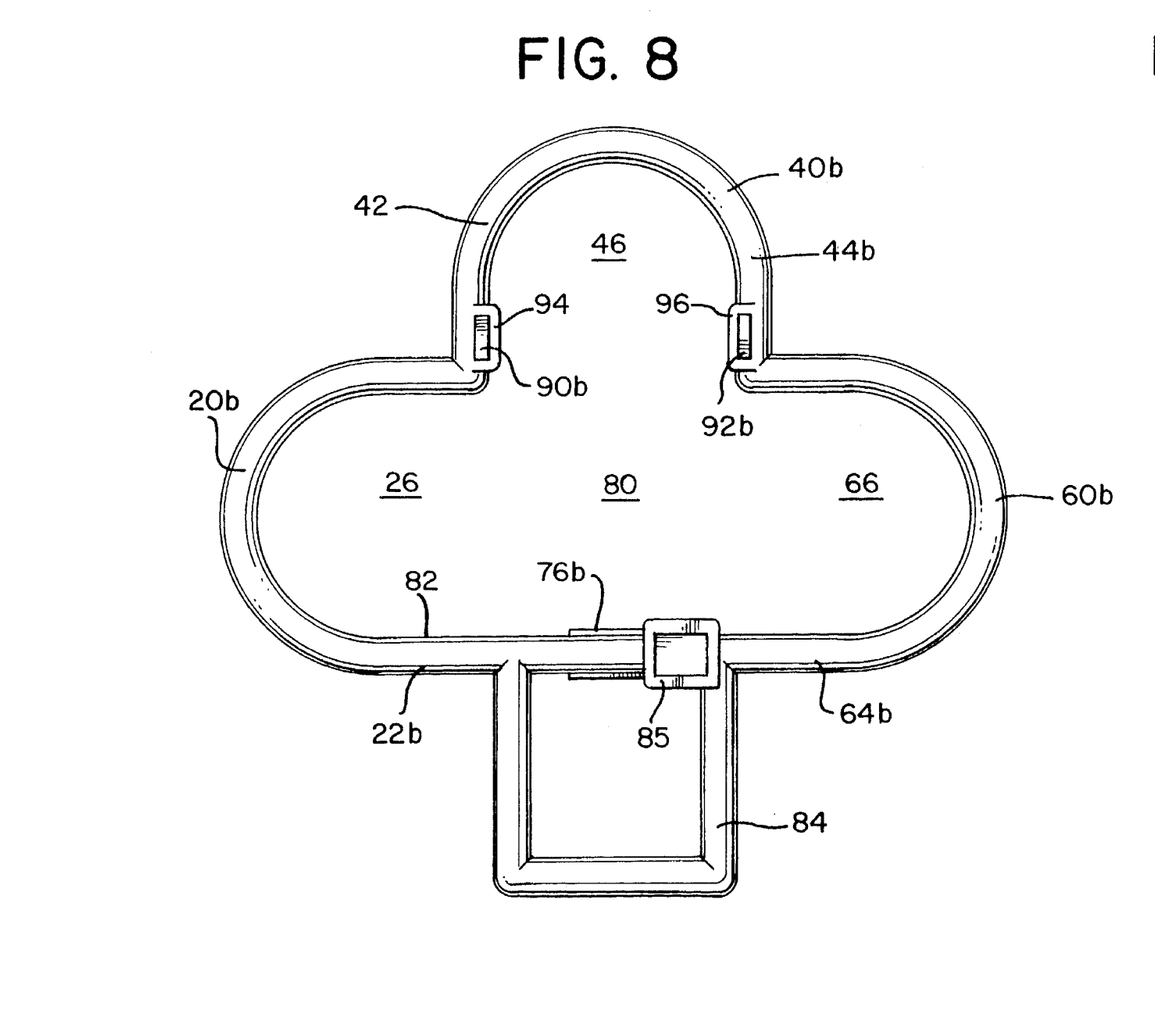
FIG. 8 is a back elevation view.
Figure 9:
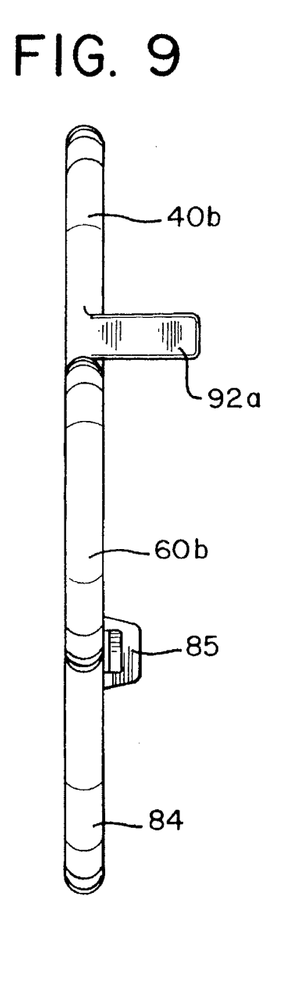
FIG. 9 is a right-side elevation view.
Figure 10:
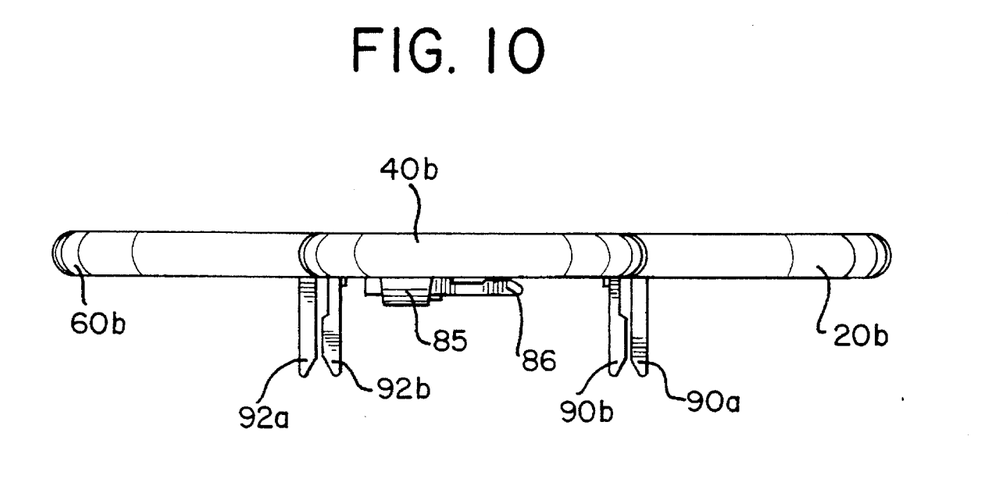
FIG. 10 is a top plan view.
Figure 11:
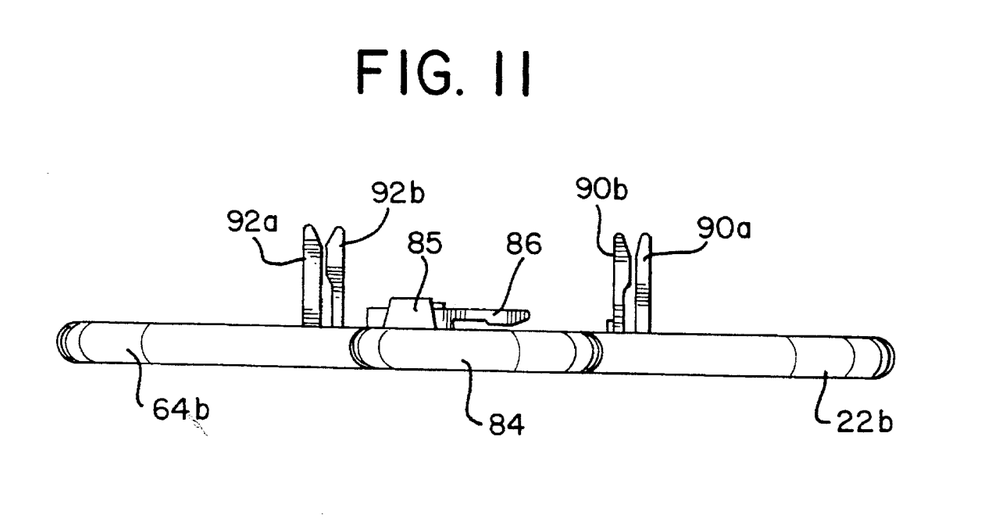
FIG. 11 is a bottom plan view of the preferred embodiment of the invention.

In a preferred embodiment, as illustrated in FIG. 5, the horizontal clip 76b is attached to the horizontal base segment 82. The horizontal clip 76b is preferably located such that the tie tail 92 is maintained in a central position with respect to the user. For ease of manufacture, the horizontal clip 76b may be formed by attaching a loop 85 to the surface of the horizontal base segment 82, the loop 85 being adapted to securely receive a flat arm 86. The flat arm 86 lies substantially parallel to the horizontal base segment 82, and is spaced sufficiently apart therefrom, in order to snugly receive the tie tail 92.

In a first embodiment of the invention (FIG. 1), the tie body may be secured to the tie-tying facilitator 10 by placing cylindrical pegs on each vertical arm of the second open loop 40. A first cylindrical peg 48 is attached at its bottom end to the first vertical leg 42 of the second open loop 40. Likewise, the second cylindrical peg 50 is attached at its bottom end to the second vertical leg 44 of the second open loop 40. The other end of the cylindrical pegs 48 and 50 is grooved or slotted so that the tie body may be held securely within these slots, while the knot is being tied. As attached, the cylindrical pegs 48 and 50 protrude outward, in the same direction, preferably normal to the plane of the elongated member 11.

The tie body may also be held securely to the tie-tying facilitator by two clips, as shown in the preferred embodiment of FIG. 5. For ease of manufacture, each clip is formed by placing two flat arms sufficiently close to each other, such that a tie body may be inserted between the two flat arms, and held securely in place. Referring to FIG. 5, a first flat arm 90a is attached to the first vertical leg 42b of the second open loop 40b. A first loop 94 is positioned immediately adjacent to the first flat arm 90a, and is adapted to securely receive a second flat arm 90b. Flat arms 90a and 90b are positioned in order to snugly receive the tie body. Likewise, a third flat arm 92a is attached to the second vertical leg 44b of the second open loop 40b. A second loop 96 is positioned immediately adjacent to the third flat arm 92a, and is adapted to securely receive a fourth flat arm 92b. Flat arms 92a and 92b are positioned so as to snugly receive the tie body. Like the cylindrical pegs 48 and 50, the two clips protrude outward, in the same direction, preferably normal to the plane of the elongated member 11.

In a preferred construction, the elongated member 11 is made of molded plastic as a continuous structure, primarily for ease of manufacture. As shown in FIG. 5, the three open loops 20b, 40b, and 60b, the handle 84, the three loops 85, 94, and 96, and the two fixed flat arms 90a and 92a may all be formed as one complete molded structure. Thus, the three flat arms 86, 90b and 92b may be inserted into their corresponding loops (85, 94 and 96 respectively) to complete the construction of the tie-tying facilitator 10.

However, the elongated member 11 need not be one continuous structure. It is conceivable as part of the invention that the loops may be formed as individual sections and joined together at a later stage during the manufacturing process, to form the desired shape.

The open loops 20, 40, and 60 are preferably U-shaped, and the edges along the length of the elongated member 11 are sufficiently bevelled or rounded, so that the tie may smoothly and freely slide over the tie-tying facilitator 10 as the knot is being formed. However, none of these design features are critical to the invention. In an alternate embodiment, the open loops may be V-shaped (FIG. 4). It is conceivable that the open loops may be formed into any other shape, provided the central space 80 may freely extent into the arms of each open loop.

The elongated member 11 may be made from any suitable material, for example, wood or metal. It is preferable, however, that the elongated member 11, the horizontal clip 76, the cylindrical pegs 48 and 50, and/or the flat arms 86, 90b and 92b are made from the same material, for example, a molded plastic material. The advantage of using a plastic material is that information such as ownership information and instructional information, may be embossed onto the surface of the elongated member 11. For example, the open loops 20, 40, and 60 may be numbered to correspond to any instructional material accompanying the tie-tying facilitator 10.

OPERATION

The tie-tying facilitator 10 is designed to be simple to use. Its primary purpose is to teach an individual how to tie a necktie knot by (1) using the tie-tying facilitator 10, and (2) following a set of instructions. Ideally, instructions are provided on how to use the tie-tying facilitator 10 for tying a variety of different knots.

Figure 3A:
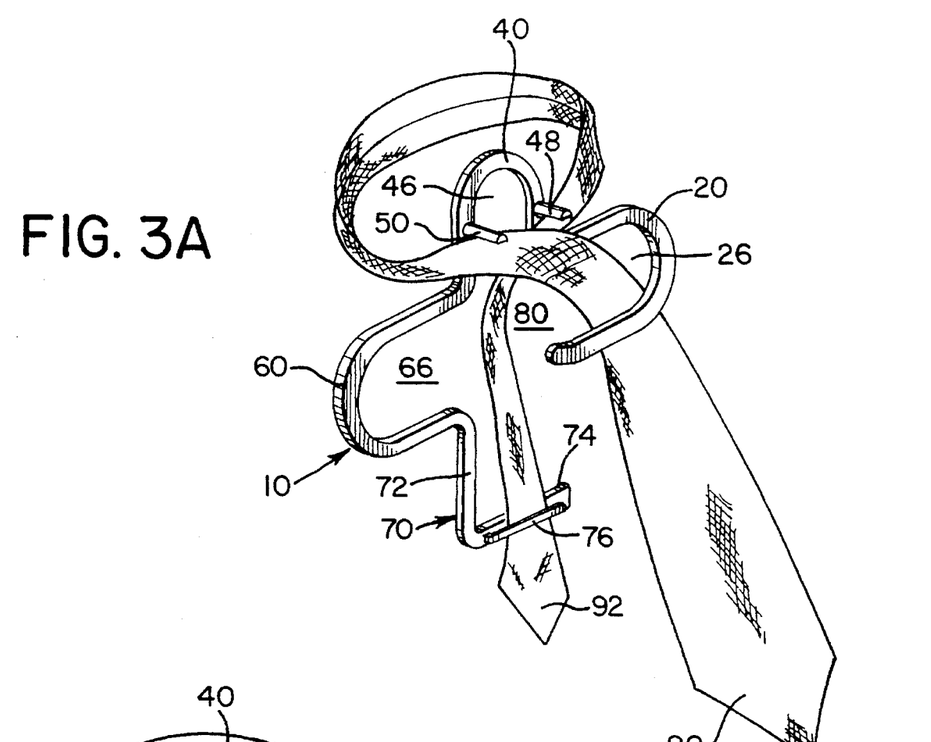
FIGS. 3A–3D illustrate the steps involved in the operation of the invention.
Figure 3B:
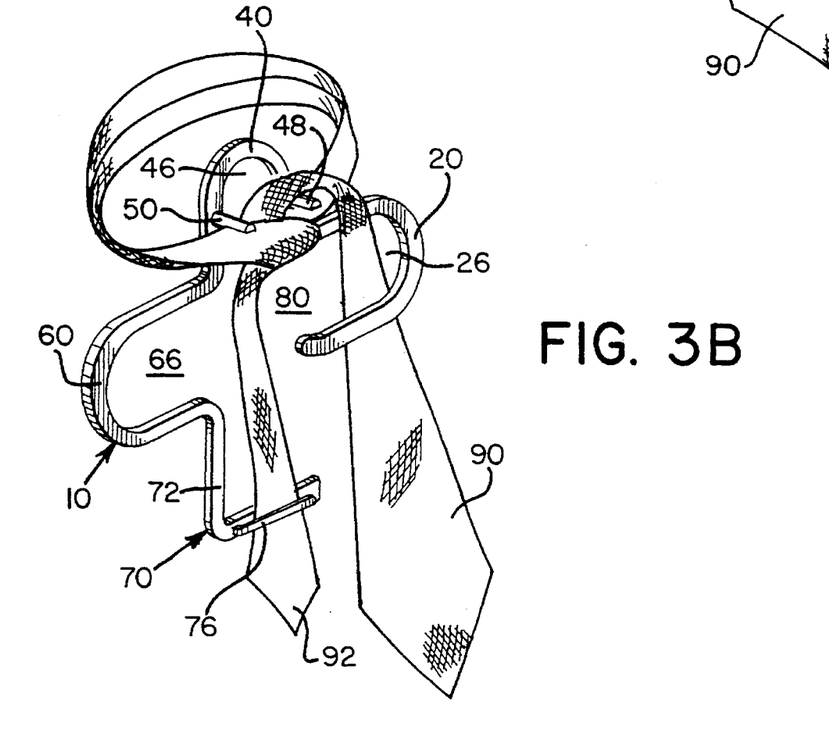
Figure 3C:
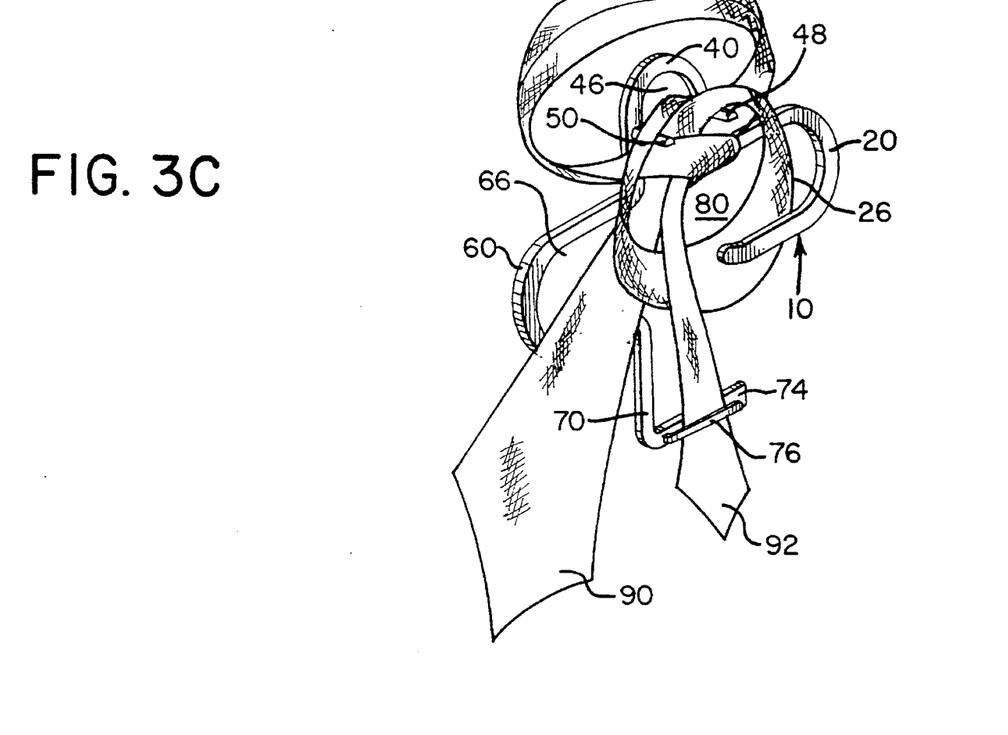
Figure 3D:
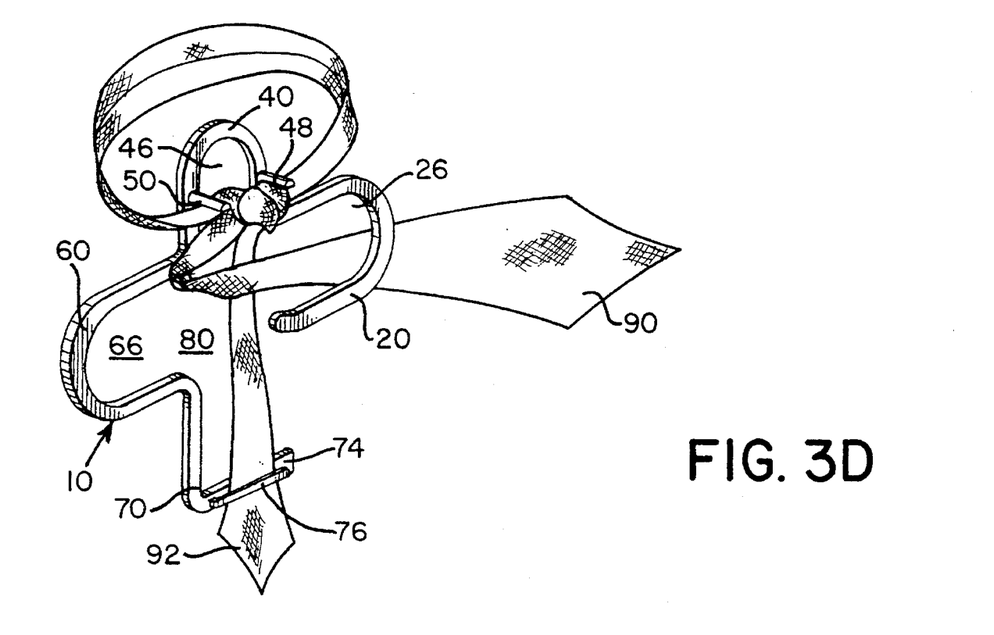

FIGS. 3A–3D illustrate the various steps employed when tying a Windsor knot using the tie-tying facilitator 10. A user would place the tie-tying facilitator 10 up against the user's chest, directly under the user's chin. The two cylindrical slotted pegs 48 and 50 should face away from the user. The user then follows the instructions provided for tying a Windsor knot:

a. place the tie around user's neck with the tie tail 92 hanging on the left-hand side (user's left), and the large end of the necktie ("tie head") 90 hanging down the right-hand side (user's right) (FIG. 3A);

b. insert the tie tail 92 into the slot in the first cylindrical peg 48 and into the horizontal clip 76 to keep the tie tail 92 secure while the knot is being tied (FIG. 3A);

c. insert the tie head 90 into the slot in the second cylindrical peg 50 to hold the tie body secure while the knot is tied (FIG. 3A);

d. place the tie head 90 over the tie body and down through the first space 26 (FIG. 3A);

e. pull the tie head 90 up through the second space 46 and down through the first space 26, to complete the left-hand side of the Windsor knot (FIG. 3B);

f. bring the tie head 90 around the back of the tie body and up through the third space 66 (FIG. 3C);

g. pull the tie head 90 down through the second space 46 and back up through the third space 66 to complete the right-hand side of the Windsor knot (FIG. 3C);

h. cross the tie head 90 over the tie body (knot) to create a top-of-knot fold, and pull the tie head 90 down through the first space 26 (FIG. 3D);

i. bring the tie head 90 up through the second space 46 and insert the tie head 90 under the top-of-knot fold;

j. pull the tie head 90 down to form the completed Windsor knot; and k. remove the tie-tying facilitator 10 from the necktie by removing the tie body from the first and second cylindrical pegs 48 and 50, and by removing the tie tail 92 from the horizontal clip 76.

It is readily apparent that by providing appropriate instructions, the tie-tying facilitator 10 can be used to teach a person how to tie a variety of necktie knots.

While the invention has been particularly shown and described with reference to a preferred embodiment thereof, it will be understood by those skilled in the art that various changes in form and details may be made therein without departing from the spirit and scope of the invention.

I claim:

1. A tie-tying facilitator comprising an elongated member having a first open loop extending outwardly in a first direction, the first open loop having upper and lower horizontal arms, and partially surrounding a first space, a second open loop extending upwardly in a second direction, the second open loop having first and second vertical legs, and partially surrounding a second space, the second space being contiguous with the first space, a third open loop extending outwardly in a third direction, the third open loop having upper and lower horizontal arms, and partially surrounding a third space, the third space being contiguous with the first and second spaces, and an L-shaped tail segment extending in a downward direction having a vertical portion and a horizontal portion, wherein the upper horizontal arm of the first open loop is attached to the first vertical leg of the second open loop, the second vertical leg of the second open loop is attached to the upper horizontal arm of the third open loop, and the lower horizontal arm of the third open loop is attached to the vertical portion of the L-shaped tail segment, such that the first, second and third spaces are contiguous with each other at the center of the tie-tying facilitator.

2. The tie-tying facilitator as in claim 1 further comprising a first and a second cylindrical peg, both having top and bottom surfaces, the bottom surface of the first peg being attached to the first vertical leg of the second open loop, and the bottom surface of the second peg being attached to the second vertical leg of the second open loop, such that each peg extends in the same direction, outward from the plane of the elongated member, a slotted groove cut into the top surface of each peg, the groove being sufficiently deep so that a tie body may be held securely within the groove.

3. The tie-tying facilitator as in claim 2 further comprising a horizontal clip member lying substantially parallel to the horizontal portion of the L-shaped tail segment and attached at at least one end to the horizontal portion of the L-shaped tail segment, such that a tie tail may be secured by the horizontal clip member as the knot is formed.

4. The tie-tying facilitator as in claim 1 wherein the elongated member is a continuous molded structure.

5. The tie-tying facilitator as in claim 4 wherein the elongated member is made from plastic.

6. The tie-tying facilitator as in claim 1 wherein the first, second and third open loops are substantially U-shaped.

7. The tie-tying facilitator as in claim 1 wherein the first, second and third open loops are substantially V-shaped.

8. A tie-tying facilitator comprising an elongated member having three open loops joined together to surround a central space, and a handle portion, a first open loop extending outwardly in a first direction, the first open loop having upper and lower horizontal arms, and partially surrounding a first space, a second open loop extending upwardly in a second direction, the second open loop having first and second vertical legs, and partially surrounding a second space, the second space being contiguous with the first space, a third open loop extending outwardly in a third direction, the third open loop having upper and lower horizontal arms, and partially surrounding a third space, the third space being contiguous with the first and second spaces, wherein the upper horizontal arm of the first open loop is attached to the first vertical leg of the second open loop, the second vertical leg of the second open loop is attached to the upper horizontal arm of the third open loop, the lower horizontal arm of the third open loop is attached to the lower horizontal arm of the first open loop forming a horizontal base segment, such that the first, second, and third spaces are contiguous with each other, enclosing a central space, and the handle portion is attached to the horizontal base segment.

9. The tie-tying facilitator as in claim 8 wherein the handle is rectangularly shaped.

10. The tie-tying facilitator as in claim 8 further comprising first and second clips, the first clip being attached to the first vertical leg of the second open loop, and the second clip being attached to the second vertical leg of the second open loop, such that each clip extends in the same direction, outward from the plane of the elongated member, a horizontal clip lying substantially parallel to the horizontal base portion, wherein the first clip, the second clip, and the horizontal clip are each adapted to securely receive a tie body as the knot is formed.

11. The tie-tying facilitator as in claim 10 wherein the elongated member and the handle are molded as one continuous structure.

12. The tie-tying facilitator as in claim 11 wherein the elongated member and the handle are made from plastic.

\* \* \* \* \*